United States Patent
Douglas et al.

(10) Patent No.: US 10,929,126 B2
(45) Date of Patent: *Feb. 23, 2021

(54) INTERCEPTING AND REPLAYING INTERACTIONS WITH TRANSACTIONAL AND DATABASE ENVIRONMENTS

(71) Applicant: INTERNATIONAL BUSINESS MACHINES CORPORATION, Armonk, NY (US)

(72) Inventors: Jeffrey Douglas, Raleigh, NC (US); Timothy W Wilson, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/433,016

(22) Filed: Jun. 6, 2019

(65) Prior Publication Data

US 2020/0387370 A1    Dec. 10, 2020

(51) Int. Cl.
*G06F 9/45*        (2006.01)
*G06F 8/76*        (2018.01)
(Continued)

(52) U.S. Cl.
CPC .............. *G06F 8/76* (2013.01); *G06F 8/427* (2013.01); *G06F 11/34* (2013.01); *G06F 16/1865* (2019.01)

(58) Field of Classification Search
CPC ........ G06F 8/76; G06F 8/427; G06F 16/1865; G06F 11/34
(Continued)

(56) References Cited

U.S. PATENT DOCUMENTS 5,157,716 A * 10/1992 Naddor .................. H04M 3/46
                                                        340/9.1
5,355,479 A    10/1994 Torii
(Continued)

FOREIGN PATENT DOCUMENTS

WO    2015078248 A1    6/2015

OTHER PUBLICATIONS

Perez et al, "Generating Predicate Callback Summaries for the Android Framework", IEEE, pp. 68-78 (Year: 2017).*
(Continued)

*Primary Examiner* — Anil Khatri
(74) *Attorney, Agent, or Firm* — Teddi E. Maranzano

(57) ABSTRACT

Methods, systems and computer program products for replaying arguments of a module in real-time is provided. Input includes indicator of the original execution environment, a location of load libraries having a plurality of callback modules, and a location of previously recorded data. A mapping table that corresponds to the execution environment is loaded into system memory. Batch execution of an application starts. Environmental calls to the application are intercepted. The transaction id and arguments are identified and previously recorded data that corresponds to the transaction id is loaded into system memory. The arguments to the call are populated with data from the corresponding record in the recorded data. Based on there being a corresponding callback module for the transaction, invoking the callback module and augmenting or replacing the arguments to the call with data in the callback module.

17 Claims, 4 Drawing Sheets

(51) Int. Cl.
*G06F 16/18* (2019.01)
*G06F 11/34* (2006.01)
*G06F 8/41* (2018.01)

(58) Field of Classification Search
USPC .................................. 717/124–132, 155–160
See application file for complete search history.

(56) References Cited

U.S. PATENT DOCUMENTS

| | | | |
|---|---|---|---|
| 5,413,387 A | 5/1995 | Bartholomew | |
| 5,450,586 A | 9/1995 | Kuzara | |
| 5,673,315 A | 9/1997 | Wolf | |
| 5,987,463 A * | 11/1999 | Draaijer | G06F 16/24553 |
| 6,061,738 A | 5/2000 | Osaku | |
| 6,199,068 B1 | 3/2001 | Carpenter | |
| 6,202,199 B1 | 3/2001 | Wygodny | |
| 6,236,997 B1 * | 5/2001 | Bodamer | G06F 16/258 |
| 6,282,701 B1 | 8/2001 | Wygodny | |
| 6,311,327 B1 | 10/2001 | O'Brien | |
| 6,463,583 B1 | 10/2002 | Hammond | |
| 6,477,666 B1 | 11/2002 | Sanchez | |
| 6,571,092 B2 | 5/2003 | Faccin | |
| 6,581,052 B1 | 6/2003 | Slutz | |
| 6,629,123 B1 * | 9/2003 | Hunt | G06F 9/5066 |
| | | | 714/E11.209 |
| 6,647,545 B1 | 11/2003 | Kurts | |
| 6,654,949 B1 * | 11/2003 | Fraenkel | G06F 11/3466 |
| | | | 714/E11.2 |
| 6,698,016 B1 | 2/2004 | Ghizzoni | |
| 6,721,941 B1 | 4/2004 | Morshed | |
| 6,745,385 B1 | 6/2004 | Lupu | |
| 6,779,187 B1 | 8/2004 | Hammond | |
| 6,823,460 B1 | 11/2004 | Hollander et al. | |
| 6,862,730 B1 | 3/2005 | Gorti | |
| 6,907,547 B2 * | 6/2005 | Shaw | G06F 11/261 |
| | | | 714/38.11 |
| 6,941,545 B1 | 9/2005 | Reese | |
| 6,971,084 B2 * | 11/2005 | Grey | G06F 9/52 |
| | | | 717/106 |
| 7,134,085 B2 | 11/2006 | Austin | |
| 7,191,433 B2 | 3/2007 | Narad et al. | |
| 7,225,428 B1 | 5/2007 | Fetzer | |
| 7,343,625 B1 | 3/2008 | Zaidi | |
| 7,493,630 B2 * | 2/2009 | Hunt | G06F 9/465 |
| | | | 719/330 |
| 7,533,388 B1 | 5/2009 | Cavanaugh | |
| 7,562,341 B2 | 7/2009 | Kovachka-Dimitrova | |
| 7,603,661 B2 * | 10/2009 | Maine | G06F 8/427 |
| | | | 717/132 |
| 7,634,778 B2 * | 12/2009 | Mosier | G06F 9/4812 |
| | | | 714/2 |
| 7,657,537 B1 * | 2/2010 | Corbett | G06F 3/0614 |
| | | | 718/101 |
| 7,770,154 B2 | 8/2010 | Lam | |
| 7,797,708 B2 | 9/2010 | Weber | |
| 7,900,193 B1 | 3/2011 | Kolawa | |
| 7,962,899 B2 | 6/2011 | Thompson | |
| 7,966,398 B2 | 6/2011 | Wiles, Jr. | |
| 8,000,461 B2 | 8/2011 | Holder | |
| 8,060,864 B1 | 11/2011 | Michelsen | |
| 8,176,488 B1 | 5/2012 | Dobrovolskiy | |
| 8,185,724 B2 | 5/2012 | Ford | |
| 8,312,435 B2 | 11/2012 | Wygodny | |
| 8,369,822 B2 | 2/2013 | Hursey | |
| 8,402,318 B2 | 3/2013 | Nieh | |
| 8,510,828 B1 * | 8/2013 | Guo | G06F 21/566 |
| | | | 726/22 |
| 8,516,451 B2 | 8/2013 | Tendler | |
| 8,631,387 B2 * | 1/2014 | Henderson | G06F 8/355 |
| | | | 717/108 |
| 8,666,968 B2 * | 3/2014 | Sachs | G06F 9/547 |
| | | | 707/713 |
| 8,671,387 B2 | 3/2014 | Quine | |
| 8,776,223 B2 | 7/2014 | Balakrishnan | |
| 8,850,268 B2 | 9/2014 | Froehlich | |
| 8,954,929 B2 | 2/2015 | Braude | |
| 8,977,904 B2 * | 3/2015 | Kraus | G06F 11/3414 |
| | | | 714/25 |
| 9,135,127 B1 | 9/2015 | Havemose | |
| 9,141,415 B2 | 9/2015 | Rasmussen | |
| 9,158,604 B1 | 10/2015 | Christodorescu | |
| 9,218,464 B2 | 12/2015 | Wicker | |
| 9,256,476 B2 * | 2/2016 | McKenney | G06F 9/522 |
| 9,298,588 B2 | 3/2016 | Seto | |
| 9,323,667 B2 | 4/2016 | Bennett | |
| 9,405,555 B2 | 8/2016 | Livshits | |
| 9,489,182 B1 | 11/2016 | Cawley | |
| 9,665,474 B2 | 5/2017 | Li | |
| 9,678,747 B2 | 6/2017 | Beckett | |
| 9,697,108 B2 * | 7/2017 | Ligman | G06F 11/3688 |
| 9,946,525 B2 | 4/2018 | Tibble | |
| 10,043,187 B2 | 8/2018 | Stern | |
| 10,051,008 B2 | 8/2018 | Mooring | |
| 10,157,214 B1 | 12/2018 | Abuomar | |
| 10,216,488 B1 | 2/2019 | Overson | |
| 10,223,233 B2 | 3/2019 | Abou Mahmoud | |
| 10,509,739 B1 * | 12/2019 | Gudipati | G06F 9/4881 |
| 2005/0071856 A1 | 3/2005 | Kumar | |
| 2006/0047713 A1 * | 3/2006 | Gornshtein | G06F 16/27 |
| 2007/0143795 A1 | 6/2007 | Tran | |
| 2007/0283331 A1 | 12/2007 | Pietrek | |
| 2016/0246622 A1 | 8/2016 | Simonyan | |
| 2016/0328221 A1 | 11/2016 | Soeder | |
| 2017/0004116 A1 | 1/2017 | Mital | |
| 2017/0017528 A1 * | 1/2017 | Hua | G06F 9/4493 |
| 2017/0206119 A1 | 7/2017 | Zhang | |
| 2017/0277551 A1 | 9/2017 | Nicholson | |
| 2017/0289338 A1 | 10/2017 | Riva | |
| 2017/0329621 A1 | 11/2017 | Beckett | |
| 2018/0143857 A1 | 5/2018 | Anbazhagan | |
| 2018/0173617 A1 | 6/2018 | Tian | |
| 2018/0285143 A1 | 10/2018 | Bacher | |
| 2019/0065291 A1 | 2/2019 | MacNeil | |

OTHER PUBLICATIONS

Sotomayar et al, "Combining Batch Execution and Leasing Using Virtual Machines", ACM, pp. 87-96 (Year: 2008).*
Leung et al, "On the Execution of Large Batch Programs in Unreliable Computing Systems", IEEE, 444-450 (Year: 1984).*
Perez et al. "Predicate Callback Summaries", IEEE, pp. 291-293 (Year: 2017).*
Hermanns et al, "Enabling callback-driven runtime introspection via MPI_T", ACM, pp. 1-10 (Year: 2018).*
Grossman et al, "Online Detection of Effectively Callback Free Objects with applications to Smart Contracts", ACM, pp. 1-28 (Year: 2018).*
IBM: List of IBM Patents or Patent Applications Treated as Related (Appendix P), Jun. 11, 2019, 2 pages.
Pending U.S. Appl. No. 16/432,998, filed Jun. 6, 2019, entitled: "Determining Caller of a Module in Real-Time", 23 pages.
Pending U.S. Appl. No. 16/433,000, filed Jun. 6, 2019, entitled: "Bypassing Execution of a Module in Real-Time", 24 pages.
Pending U.S. Appl. No. 16/433,010, filed Jun. 6, 2019, entitled: "Intercepting and Recording Calls to a Module in Real-Time", 25 pages.
Pending U.S. Appl. No. 16/433,019, filed Jun. 6, 2019, entitled: "Replaying Interactions With Transactional and Database Environments With Re-Arrangement", 29 pages.
Santos et al., "A Framework for Smart Proxies and Interceptors in RMI", 19 pages, Article • Oct. 2002.
Li et al., "A VMM-based System Call Interposition Framework for Program Monitoring", 2010 16th International Conference on Parallel and Distributed Systems, 2010 IEEE, pp. 706-711.
Disclosed Anonymously, "Method and System of generating Unit Test cases based on analysis of program parameters and data items", An IP.com Prior Art Database Technical Disclosure, IP.com No. IPCOM000236931D, IP.com Electronic Publication Date: May 22, 2014, 6 pages.

(56) References Cited

OTHER PUBLICATIONS

Li et al., "Interceptors for Java™ Remote Method Invocation", Proceedings of the 2001 International Conference on Parallel and Distributed Processing Techniques and Applications, vol. II, p. 850-856, Las Vegas, Nevada, Jun. 25-28, 2001.

Panzl, "Automatic Software Test Drivers", An IP.com Prior Art Database Technical Disclosure, Original Publication Date: Apr. 1, 1978, Original Disclosure Information: IEEE Computer vol. 11 No. 4, pp. 44-50, IP.com. No. IPCOM000131295D, IP.com Electronic Publication Date: Nov. 10, 2005, 10 pages.

Siemens et al., "Dynamic Performance Stubs", An Ip.com Prior Art Database Technical Disclosure, Original Publication Date: Jun. 25, 2008, IP.com No. IPCOM000171523D, IP.com Electronic Publication Date: Jun. 25, 2008, 4 pages.

Xiong et al., "The Architectural Based Interception and Identification of System Call Instruction Within VMM", International Workshop on Cloud Computing and Information Security (CCIS 2013), © 2013, The authors—Published by Atlantis Press, pp. 73-76.

Zhang et al, "Constructing Accurate Application Call Graphs for Java to Model Library Callbacks", Proceedings of the Sixth IEEE International Workshop on Source Code Analysis and Manipulation (SCAM'06), IEEE 2006, pp. 1-10.

Gallaba et al., "Don't Call Us, We'll Call You: Characterizing Callbacks in JavaScript", 2015 IEEE, pp. 247-256.

Jiang, "Automated Analysis of Load Testing Results", ISSTA '10, Jul. 12-16, 2010, pp. 143-146.

Yang et al., "Towards a Structural Load Testing Tool", ISSTA '96, pp. 201-208, 1996.

Aulbach et al., "Multi-Tenant Databases for Software as a Service: Schema-Mapping Techniques", SIGMOD'08, Jun. 9-12, 2008, pp. 1195-1206.

Ermilov et al., "User-driven Semantic Mapping of Tabular Data", ISEM '13, Sep. 4-6, 2013, pp. 105-112.

Keller, Mapping Objects to Tables A Pattern Language, Mapping Objects to Tables, Proceedings EuroPLoP, pp. 1-26 (1997).

Marinescu et al., "Efficient Testing of Recovery Code Using Fault Injection", ACM, pp. 1-38, (2011).

Wang et al., "Synthesizing Mapping Relationships Using Table Corpus", SIGMOD'17, May 14-19, 2017, pp. 1117-1132.

Beck et al., "A Visual Analysis and Design Tool for Planning Software Re-engineerings", IEEE, Downloaded Dec. 7, 2020, pp. 1-8 (Year: 2011).

Patrignani et al., "Secure Compilation to Protected Module Architectures", ACM Transactions on Programming Languages and Systems, vol. 37, No. 2, Article 6, Publication date: Apr. 2015, pp. 6:1-6:50.

Snyder, "A Method Using Procedural Parameters and Callback Functions to Create a Generic Exchange-Sorting Module", JCSC 16, vol. 2, (May 2001), pp. 136-144.

Wan et al., "Discovering Transitional Patterns and Their Significant Milestones in Transaction Databases", IEEE Transactions on Knowledge and Data Engineering, vol. 21, No. 12, Dec. 2009, pp. 1692-1707.

Wang et al., "Call Me Back! Attacks on System Server and System Apps in Android through Synchronous Callback", CCS' 16, Oct. 24-28, 2016, Vienna, Austria, pp. 92-103.

Wu et al., "Light-Weight, Inter-Procedural and Callback-Aware Resource Leak Detection for Android Apps", IEEE Transactions on Software Engineering, vol. 42, No. 11, Nov. 2016, pp. 1054-1076 (Year: 2016).

* cited by examiner

INTERCEPTING AND REPLAYING INTERACTIONS WITH TRANSACTIONAL AND DATABASE ENVIRONMENTS

BACKGROUND

The present invention generally relates to testing load modules, and more specifically, to intercepting and replaying interactions with transactional and database environments.

With complex computer applications, it can be difficult to understand the effects that are produced when some of the data is changed. Changes to one field might have effects upon another, unknowingly to the developer making the changes. Without a proper understanding of application logic and data relationships, coding errors can be difficult to detect and can result in defective source code.

The interaction between an application's argument fields and the result of the execution can be determined. This interaction difference, caused by a data change, can be identified in real time during execution, allowing a user to understand the relationship between application data changes and the application logic that is affected. This identification can be recorded for use later.

SUMMARY

Embodiments of the present invention are directed to a computer-implemented method for replaying arguments of a module in real-time. The method provides locating and loading input into system memory, the input comprising, tags indicating an original execution environment, mapping tables corresponding to the original execution environment, a plurality of callback modules, and recorded data. The method further provides beginning a batch execution of an application. In response to intercepting an environmental call issued by the application, for each environmental call in the transaction the transaction is identified by transaction id, type of call and arguments to the call. The recorded data corresponding to the transaction id is loaded into system memory. The method provides for populating the arguments to the call with data from the corresponding record in the recorded data, and reporting the populated arguments to the call.

Embodiments of the present invention are directed to a system for replaying arguments of a module in real-time. The system includes a memory having computer readable computer instructions, and a processor for executing the computer readable instructions, that when executed, cause the processor to locate and load input into system memory. The input comprises, tags indicating an original execution environment, mapping tables corresponding to the original execution environment, a plurality of callback modules, and recorded data. The system begins a batch execution of an application. In response to intercepting an environmental call issued by the application, for each environmental call in the transaction, the system identifies the transaction by transaction id, type of call and arguments to the call. The system loads the recorded data that corresponds to the transaction id into system memory. The system populates the arguments to the call with data from the corresponding record in the recorded data, and reports the populated arguments to the call.

Embodiments of the invention are directed to a computer program product for replaying arguments of a module in real-time. The computer program product comprises a computer readable storage medium having program instructions embodied therewith. The computer readable storage medium is not a transitory signal per se. The computer program instructions are executable by a processor to cause the processor to locate and load input into system memory. The input comprises tags indicating an original execution environment, mapping tables corresponding to the original execution environment, a plurality of callback modules, and recorded data. The computer program product begins a batch execution of an application. In response to intercepting an environmental call issued by the application, and for each environmental call in the transaction, the computer program product identifies the transaction by transaction id, type of call and arguments to the call. The computer program product loads the recorded data that corresponds to the transaction id into system memory, populates the arguments to the call with data from the corresponding record in the recorded data, and reports the populated arguments to the call.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
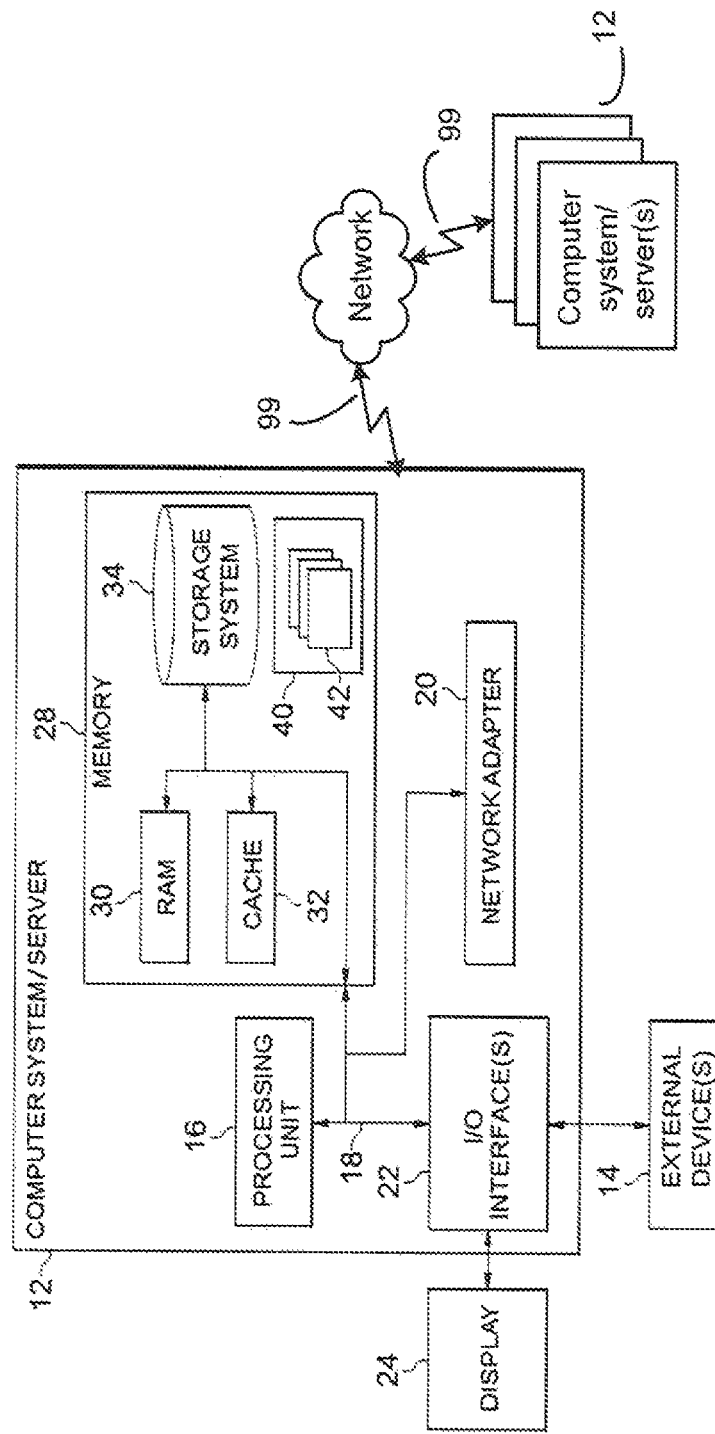
FIG. 1 depicts a block diagram of a computer system for use in implementing one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

In current practice, in order to identify the relationship between application logic and application data in real-time, access to both the transactional and database execution environments are needed. That is, the application's modules are integrated into the execution environment and depend upon the framework provided by the transactional or database execution environment in order to execute. Testing changes made to a module typically requires recompiling individual modules and linking them into the execution environment. Source code and debugging tools are typically used.

Embodiments of the present invention tend to improve system reliability by providing a framework for recording and replaying application interactions with transactional and database environments in real-time, and without the original execution environment. In order to identify the relationship between application logic and application data in real-time, the application calls to the execution environment, and the original argument data, are recorded. Data that the execution environment returns in response to the call are also recorded. The recorded data is then used in a batch execution to replay the original application interactions without the need for the original execution environment. When replaying previously recorded application interactions, a user can test the effects of data and logic changes on the application, without the need to change the application itself. This is done by defining additional program logic and data in one or more callback modules that are executed during application replay. Differences between the data as originally replayed and the augmented data following the execution of a callback are identified in real-time during execution, allowing a user to understand the relationship between application data changes and the application logic that is affected.

Figure 2:
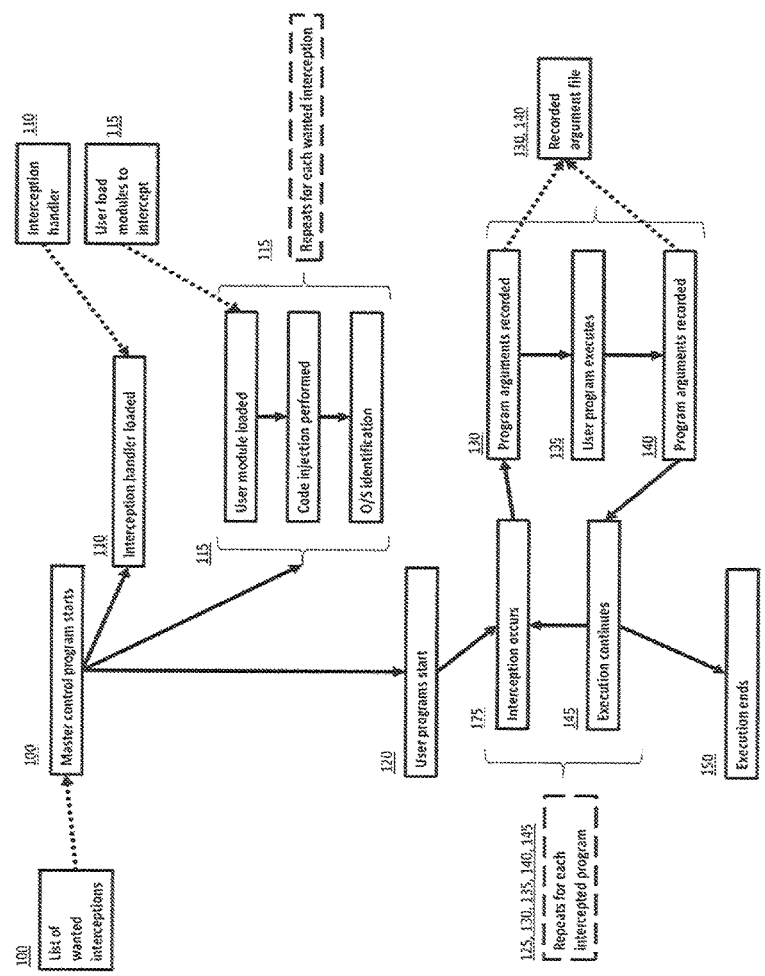
FIG. 2 depicts a flow diagram of intercepting and recording calls to a module, according to one or more embodiments of the present invention.
Figure 3:
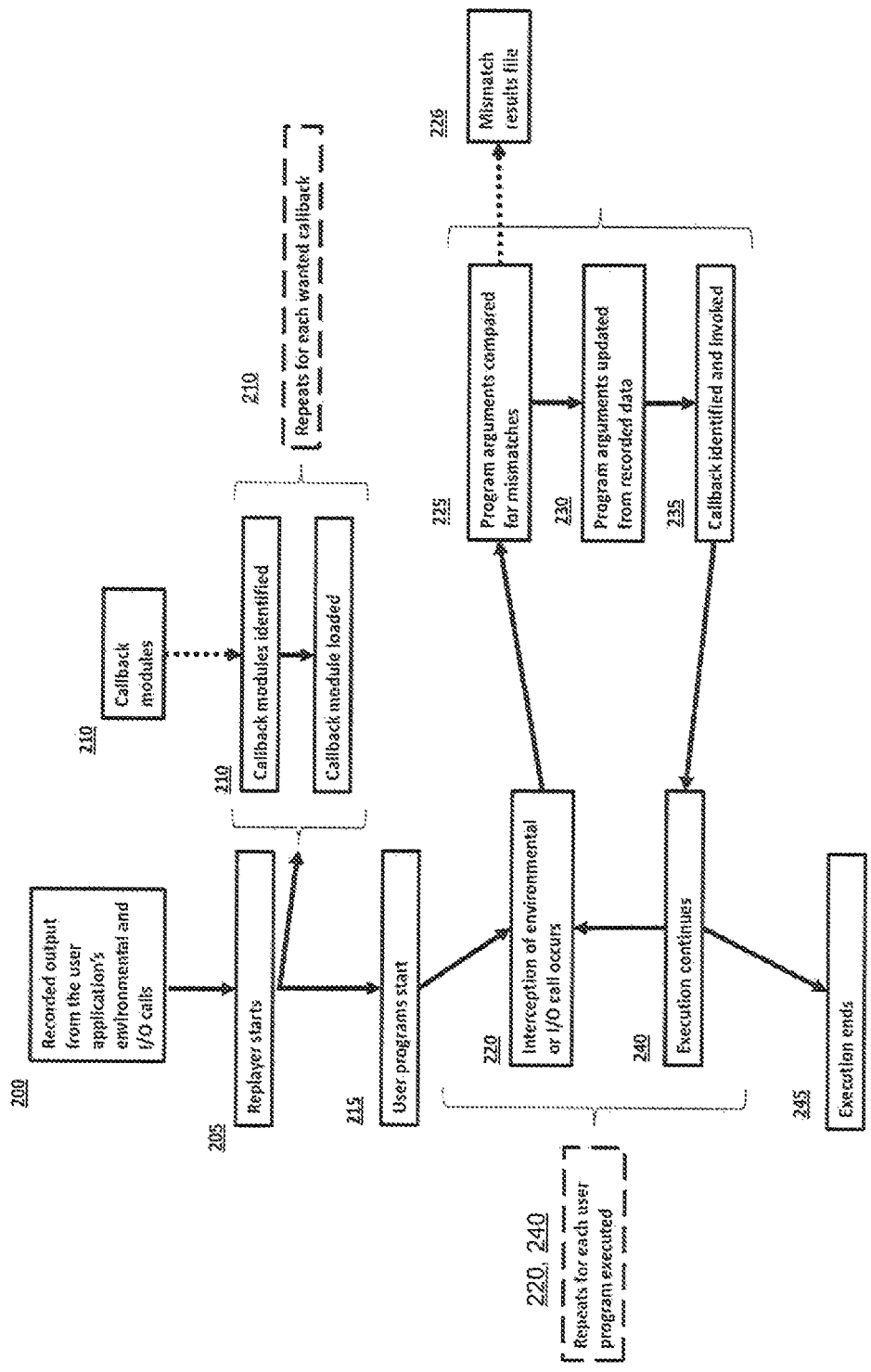
FIG. 3 depicts a flow diagram of replaying interactions with transactional and database environments, according to one or more embodiments of the present invention.

As will be shown in FIGS. 2 and 3, the intercepting, recording, and replaying are executed without modifying the application modules. Additionally, access to the application's arguments is performed without source code, without requiring the original execution environment, without modifying or relinking the application modules, and without the use of debugging or tracing tools. In summary, the testing framework is self-contained. Therefore, in addition to module, unit, and functional test, a system verification test can be performed without manually typing test cases and test data.

Turning to the figures, FIG. 1 depicts an example block diagram of a host computer system/server 12 (server) which is in communication with one or more components. As shown, multiple servers 12 may be distributed over a wide geographic area and be in electronic communication with each other, and with the other components shown in FIG. 1, via the network 99.

The server 12 is operational in numerous other computing system environments or configurations. For example, the server 12 may be a standalone machine, a virtual partition on physical host, a clustered server environment, or a distributed cloud computing environment that include any of the above systems or devices, and the like. When practiced in a distributed cloud computing environment, tasks may be performed by both local and remote servers 12 that are linked together and communicate through a communications network, such as the network 99.

The server 12 may be described in the context of executable instructions, such as a program, or more specifically, an operating system (OS) 40 that is an aggregate of program modules 42 being executed by the processing unit 16 to control the operation of the server 12. Program modules 42 perform particular tasks of the OS 40, such as process management; memory management; and device management. Specialized program modules 42 can cooperate with the OS 40 to perform source code management functions, such as compiling, linking, and preparing the resulting module(s) for execution by the processing unit 16. Other specialized program modules can provide a transactional or database environment in which the application program modules execute. Still other specialized program modules 42 can cooperate with the OS 40 to record the calls and the data from the calls. The recorded data is input to replay the calls.

The program modules 42 may be implemented as routines, programs, objects, components, logic, or data structures, for example. The program modules 42 performing the particular tasks may be grouped by function, according to the server 12 component that the program modules 42 control. At least a portion of the program modules 42 may be specialized to execute the testing framework of FIGS. 2 and 3.

In a distributed computing environment, such as a cloud computing environment, each participating server 12 may be under the control of an OS 40 residing on each local and remote server 12, respectively. In a virtual machine, also referred to as a virtual server, each instance of the virtual machine is an emulation of a physical computer. A physical computer may host multiple virtual machine instances, each sharing the hardware resources of the physical computer, and each emulating a physical computer. Each of the virtual machine instances is under the control of an OS 40.

As shown in FIG. 1, the components of the server 12 may include, but are not limited to, one or more processors or processing units 16, a system memory 28, and a bus 18 that couples various system components, such as the system memory 28, to processor 16.

System memory 28 can include computer system readable media in the form of volatile memory, such as random access memory (RAM) 30 and/or cache memory 32. The server 12 may further include other removable/non-removable, volatile/non-volatile computer system storage media. By way of example only, a storage system 34 can be provided as one or more devices for reading from and writing to a non-removable, non-volatile magnetic media, such as a hard disk drive (HDD) or an optical disk drive such as a CD-ROM, DVD-ROM. Each device of the storage system 34 can be connected to bus 18 by one or more data media interfaces. The program modules 42, the OS 40, and one or more application programs, load modules, source code files, and system parameter files (e.g., the input arguments for the testing framework) may be stored on the storage system 34 and subsequently loaded into memory 28 for execution, as needed.

The server 12 may also communicate with one or more external devices 14 such as a keyboard, a pointing device, a display 24, etc.; one or more devices that enable a user to interact with the server 12; and/or any devices (e.g., network card, modem, etc.) that enable the server 12 to communicate with one or more other computing devices. Such communication can occur via I/O interfaces 22. Still, the server 12 can communicate with one or more networks such as a local area network (LAN), a general wide area network (WAN), and/or a public network (e.g., the Internet) via a network adapter 20. As depicted, the network adapter 20 communicates with the other components of the server 12 via bus 18.

FIG. 2 depicts a flow diagram of intercepting and recording, in real-time, calls to a module, according to one or more embodiments of the present invention.

In 100, the master control program is loaded, along with an input file containing the names of the target modules, and any embedded control sections within a target module that should be recorded, into system memory. Additional input can include a tag indicating the execution environment, the location of the target modules, and one or more mapping tables that the master control program uses to determine the layout of a transaction. There can be multiple embedded control sections within a target module, and each of these control sections can be intercepted. Hereinafter, a target module can refer to a load module or a control section within the load module, unless otherwise noted. The input file can be in XML, CSV, or any other file format that the OS 40 of the server 12 can process. The user can create the input file using a graphical user interface (GUI) that can be accessed through a display 24 that is connected to the server 12, either directly or through the network 99. The user can also provide input through a command interface. By providing a dynamically modifiable input file, only a modification to the input file is needed to change the recording status of a target module.

The interception handler (110) is loaded and its entry point address is preserved in the master control program. The interception handler searches the load libraries allocated to the recorder to locate each target module listed in the input file. The operating system allocates load libraries, files, and other resources as part of dispatching the recorder for execution. The interception handler uses various operating system provided commands and service calls, depending on the operating system architecture and implementation, to search the allocated load libraries for each target module.

The master control program, indicated by 115, dynamically loads each target module listed in the input file. The specific method in which each target module is loaded may vary, depending on the operating system architecture and implementation. However, generally the target module is loaded into memory using an operating system command, such as a LOAD supervisor call, that will allow the modules of the recorder to have write access to the loaded memory.

The master control program inspects the entry point of the loaded target module for injection compatibility. The procedure for locating and inspecting the entry point varies according to the operating system architecture and implementation. However, generally an entry point is identified by a particular sequence of instructions, or by an address in a specific register.

Injection compatibility is needed because the injected code in the target module will be used to pass control to the interception handler during the execution of the recorder. Therefore, the interception handler inspects the entry point instructions of the target module to ensure the target module is in a known programming format, and that the interception handler will copy the correct number of bytes that contain the operating system linkage.

Once compatibility is determined, the entry point machine instructions from the target module entry point in memory are saved into the interception handler. These bytes provide linkage information to transfer control back to target module after the interception handler finishes execution of that target module.

The interception handler injects bytes of machine code into the in-memory copy of the target module at the entry point of the module, or at the entry point of the control section. The entry point of the control section may not be the same as the entry point of the target module, since multiple control sections may be incorporated into a load module. The injected machine code provides linkage between the interception handler and the target module, according to the protocols of the operating system. However, in general, some of the bytes of the injected machine code contain the in-memory address of the interception handler. The rest of the bytes of the injected machine code contain instructions to save the contents of a register in order to preserve it, load the in-memory address of the interception handler into that saved register and then branch to that address using the same register. The in-memory copy of the target module is identified to the operating system, using a supervisor call, for example, an IDENTIFY supervisor call. Being identified to the operating system causes the operating system to invoke the injected in-memory copy of the target module, rather than looking to load it from a library. It also leaves the original target module intact. As a result, when the target module executes, control is transferred to the interception handler.

Once the desired interceptions are injected, the master control program starts up the primary user application (120) containing the injected target modules. The application can be of any size, for example a few load modules linked together. More typically, the application is OLTP or OLAP system. The user application and the injected target modules execute as they would have had the injection not occurred. When one of the injected target modules in the user application is called, interception occurs (125), and the injected code causes the operating system to pass control to the interception handler, which receives the application's original registers, and the saved register containing the entry point of the interception handler. This transfer of control is facilitated by the recorder executing the operating system's linkage protocol.

Code is executed in the interception handler to perform the ancillary task to record the arguments passed to the target module (130, 140) in an output file. The arguments to record are identified based on identifying the call the target module issues to the execution environment, such as a GET NEXT in a database call. The layout of the arguments to be recorded may be determined by accessing an in-memory mapping table that corresponds to the call and execution environment. The mapping table provides a template for the format of each call and assists in verifying that the data being recorded conforms to the expected format for the call.

The recorded data can be input to replay the original application without the need for the original execution environment. The recording can be performed by the interception handler, or in a separate callback or utility module that the interception handler calls.

Once the recording task is finished, the interception handler uses the preserved user application registers, along with the previously saved user application code from the injection, to restore the complete set of registers. The interception handler then branches to the address of the saved user code (135). When the execution of the saved user code is finished, control is passed back to the interception handler, which branches to the application's continuation address, where the application will continue to execute normally. The continuation address is typically the next sequential instruction in the application following the instruction that caused the branch into the interception handler. However, the continuation instruction can be altered by the application or by the interception handler. When the application execution completes, control passes back to the interception handler, which records the arguments after the target application completes (140). The target application continues (145), and when execution is complete (150), the recorded application and argument relationship information can be used to assist in the identification of which applications affect passed argument data.

FIG. 3 depicts a flow diagram of replaying interactions with transactional and database environments, according to one or more embodiments of the present invention. The inputs to the replayer of FIG. 3 include the input arguments, previously recorded data captured in FIG. 2, callback modules, and the application modules.

The input arguments include: the locations of load libraries for the callback modules and application modules, the location of the previously recorded data, tags indicating the original execution environment, and the location of in-memory mapping tables corresponding to the original execution environment.

The previously recorded data includes both the input arguments that the application sent to the execution environment and the data returned as a result of the application call. In addition to the arguments, the recorded data may include the transaction name, transaction id, tags identifying the execution environment, the name of the program making the call, and whether the call is for input or output.

Each environmental call (i.e., to a database or OLTP environment) can have an associated callback module. The replayer reads the tag identifying the execution environment from the input arguments. This tag is used to search the load libraries for matching callback modules. The tag can specify the callback name in several ways, such as, by a wildcard, control section name, load module name. For example, the tag CICS_* results in all load modules or control sections matching CICS_, followed by any combination of characters, being loaded into system memory. If a program module issues a call to its associated callback module, processing time is saved by having the callback module pre-loaded. The modules are located and loaded according to the operating system protocols described with reference to FIG. 2.

When a callback module is invoked, the replayer populates the program call arguments with the previously recorded data, prior to transferring control to the callback module. The callback has access to all the program arguments. Therefore, a user can test the effects of augmenting or changing data and modifying the application logic without the need to change the application itself. Additionally, a callback module can provide the calling program with data that is missing from the previously recorded data, for example, where the program call is new since the recording of the data. In this way, application changes can be tested without having to re-record the data.

The testing framework additionally provides a utility for generating a callback program. The utility takes as input the tags in the input parameter file to know the desired environment and the format of the recorded data. The utility then parses the recorded data, and for each transaction id, creates the corresponding layout, using an in-memory mapping table of the layouts for each transaction type in the desired environment. The utility writes the layout to a file in a format that a programming language can compile, such as COBOL. The layout is inserted into a program skeleton that can either be compiled as-is or modified further according to the user requirements. In this way, the utility is flexible and driven by the recorded data, such that only transaction ids present in the data, and not all, will have a corresponding layout generated.

Continuing with FIG. 3, in 200, the recorded output captured in FIG. 2 is input to the replayer program (205). When the replayer begins executing, the replayer searches the designated load libraries and loads those callback modules that match the input argument list (210). As described above, the callback modules can be specified by full name or partially by wildcard. Entry points and control sections within the load modules are similarly interrogated for a match. The callback modules are located and loaded according to the operating system protocols described with reference to FIG. 2.

At 215, the user program begins execution, such as by a batch invocation of a transaction. The replayer, through the operating system linkages specified in the input parameter file, intercepts the application's environmental call (220). The replayer parses the intercepted call to determine the transaction id, the type of call, the program making the call, and the arguments to the call, including their lengths and data types.

The replayer loads the recorded data that corresponds to that transaction id into memory. There may be several calls, i.e., records, associated with a transaction. The replayer compares the argument list in the intercepted call to the arguments in the corresponding record. When the original execution environment is identified, a corresponding mapping table is loaded into memory. The mapping table includes layouts of each call type for the original execution environment, including the record length, field lengths and data types. The replayer locates the call type in the argument list in the intercepted call. The call type is used to locate the record layout for that call type in the mapping table. The mapping table provides a template for the format of each call and assists in verifying that the data being recorded conforms to the expected format. The replayer populates the argument list with the corresponding recorded data (225). The replayer invokes any callback module that was defined for this transaction id (230). In the callback, the user can insert or modify transaction program logic, change argument data, or perform general program logic. This allows testing of the effects of data and logic changes on the application, without the need to change the application itself.

If a callback is located, the replayer passes the argument list from the user application, now containing the arguments populated from the recorded data. The callback module makes any localized changes to these passed arguments specified by its program logic. The replayer returns control back to the user application, which continues to execute with these alterations to the argument data, if any.

The altered data may have effects on the subsequent execution logic, which can be identified by comparing the arguments from the continued environmental calls, with the recorded data. Mismatches in the comparisons are recorded (226) to identify the effects. Once all execution is complete, the mismatches can be used to assist in the identification of the effects of the changes in the arguments.

After satisfying the data request for the call, the replayer continues (240) to the next call or transaction id, until the test execution completes (245).

Figure 4:
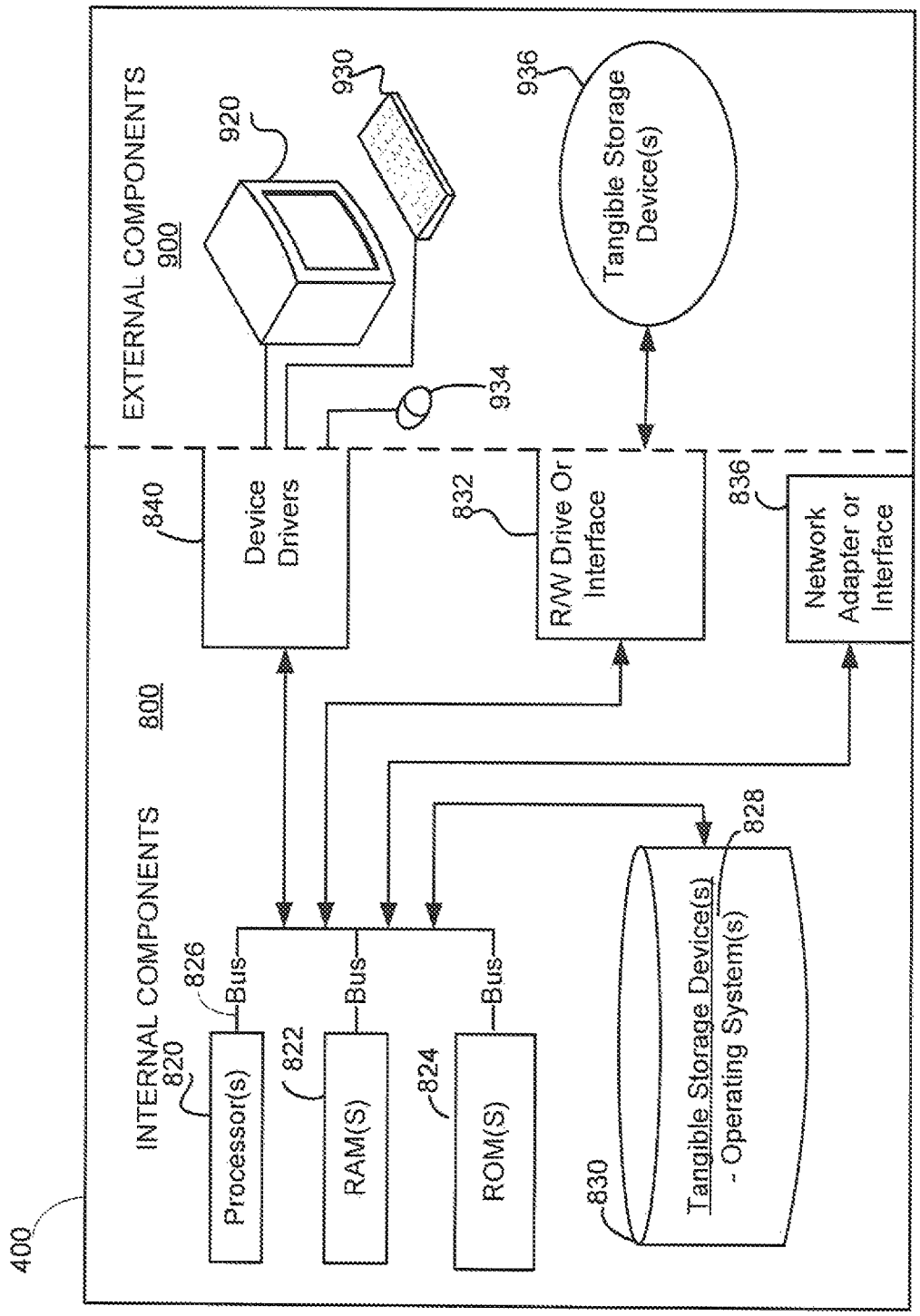
FIG. 4 depicts a block diagram of an embodiment of a computer system or cloud server in which the present invention may be implemented.

FIG. 4 is a block diagram of internal and external components of computers and servers depicted in FIG. 1 according to at least one embodiment.

It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The computer system 12 may include respective sets of internal components 800 and external components 900 illustrated in FIG. 4. Each of the sets of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs may be stored on one or more computer-readable tangible storage devices 830 for execution by one or more processors 820 via one or more RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. The testing framework can be stored on one or more of the respective portable computer-readable tangible storage devices 936, read via the respective R/W drive or interface 832 and loaded into the respective hard drive 830.

Each set of internal components 800 may also include network adapters (or switch port cards) or interfaces 836 such as a TCP/IP adapter cards, wireless Wi-Fi interface cards, or wireless interface cards or other wired or wireless communication links. The software components of the testing framework can be downloaded from an external computer (e.g., server) via a network (for example, the Internet, a local area network or other, wide area network) and respective network adapters or interfaces 836. From the network adapters (or switch port adaptors) or interfaces 836, the software components of the testing framework are loaded into the respective hard drive 830. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by software or hardware-based systems that perform the specified functions or acts or carry out combinations of computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for replaying arguments of a module in real-time, comprising:
   locating and loading input into system memory, the input comprising, tags indicating an original execution environment, mapping tables corresponding to the original execution environment, a plurality of callback modules, and recorded data;
   beginning a batch execution of an application, and in response to intercepting an environmental call issued by the application;
   for each environmental call in the transaction:
     identifying the transaction by transaction id, type of call and arguments to the call;
     loading the recorded data that corresponds to the transaction id into system memory;
     populating the arguments to the call with data from the corresponding record in the recorded data; and
     reporting the populated arguments to the call; and
   generating one or more callback modules;
   identifying the original execution environment;
   reading tags in the input parameter file to determine an environment and format of the recorded data;

parsing the recorded data for each transaction id to determine a transaction type;
matching the transaction type to a layout in the mapping table; and
writing the layout to a file, accompanied by programmatic formalities such that the skeleton can be compiled by a programming language.

2. The method of claim 1, further comprising:
based on there being a corresponding callback module defined for the transaction, invoking the callback module with the populated arguments to the call;
executing logic in the callback module to modify or augment the populated arguments to the call with data included or calculated in the callback module; and
reporting the argument data resulting from the executing of the callback module.

3. The method of claim 1, further comprising:
identifying the transaction by transaction id, and type of call;
loading the mapping table corresponding to the original execution environment;
locating the call type from the environmental call in the mapping table;
matching a layout of the call type in the mapping table to the recorded data; and
populating the arguments to the call with the matched data.

4. The method of claim 1, wherein the replayer has read-write access to the system memory where the application load modules and the callback modules are loaded.

5. The method of claim 1, wherein the execution of the replayer is self-contained.

6. The method of claim 1, further comprising invoking the callback module that includes modified arguments and data for the intercepted environmental call.

7. A computer program product for replaying arguments of a module in real-time, comprising a computer-readable storage medium having computer-readable program code embodied therewith, the computer-readable program code when executed on a computer cause the computer to:
locate and load input into system memory, the input comprising, tags indicating an original execution environment, mapping tables corresponding to the original execution environment, a plurality of callback modules, and recorded data;
begin a batch execution of an application, and in response to intercepting an environmental call issued by the application;
for each environmental call in the transaction:
identify the transaction by transaction id, type of call and arguments to the call;
load the recorded data that corresponds to the transaction id into system memory;
populate the arguments to the call with data from the corresponding record in the recorded data; and
report the populated arguments to the call; and
generate one or more callback modules;
identify the original execution environment;
read tags in the input parameter file to determine an environment and format of the recorded data;
parse the recorded data for each transaction id to determine a transaction type;
match the transaction type to a layout in the mapping table; and
write the layout to a file, accompanied by programmatic formalities such that the skeleton can be compiled by a programming language.

8. The computer program product of claim 7, further comprising:
based on there being a corresponding callback module defined for the transaction, invoke the callback module with the populated arguments to the call;
execute logic in the callback module to modify or augment the populated arguments to the call with data included or calculated in the callback module; and
report the argument data resulting from the executing of the callback module.

9. The computer program product of claim 7, further comprising:
identify the transaction by transaction id, and type of call;
load the mapping table corresponding to the original execution environment;
locate the call type from the environmental call in the mapping table;
match a layout of the call type in the mapping table to the recorded data; and
populate the arguments to the call with the matched data.

10. The computer program product of claim 7, wherein the replayer has read-write access to the system memory where the application load modules and the callback modules are loaded.

11. The computer program product of claim 7, wherein the execution of the replayer is self-contained.

12. The computer program product of claim 7, further comprising invoking the callback module that includes modified arguments and data for the intercepted environmental call.

13. The computer program product of claim 7, further comprising invoking the callback module that includes modified arguments and data for the intercepted environmental call.

14. A computer system for replaying arguments of a module in real-time, the system comprising:
one or more processors;
a memory coupled to at least one of the processors;
a set of computer program instructions stored in the memory and executed by at least one of the processors in order to perform actions of:
locating and loading input into system memory, the input comprising, tags indicating an original execution environment, mapping tables corresponding to the original execution environment, a plurality of callback modules, and recorded data;
beginning a batch execution of an application, and in response to intercepting an environmental call issued by the application;
for each environmental call in the transaction:
identifying the transaction by transaction id, type of call and arguments to the call;
loading the recorded data that corresponds to the transaction id into system memory;
populating the arguments to the call with data from the corresponding record in the recorded data; and
reporting the populated arguments to the call; and
generating one or more callback modules, wherein the generating comprises:
identifying the original execution environment;
reading tags in the input parameter file to determine an environment and format of the recorded data;
parsing the recorded data for each transaction id to determine a transaction type;
matching the transaction type to a layout in an in-memory mapping table; and writing the layout to a file, accompanied by programmatic formalities such that the skeleton can be compiled by a programming language.

15. The computer system of claim 14, further comprising:

based on there being a corresponding callback module defined for the transaction, invoking the callback module with the populated arguments to the call;

executing logic in the callback module to modify or augment the populated arguments to the call with data included or calculated in the callback module; and reporting the argument data resulting from the executing of the callback module.

16. The computer system of claim 14, further comprising:

identifying the transaction by transaction id, and type of call;

loading the mapping table corresponding to the original execution environment;

locating the call type from the environmental call in the mapping table;

matching a layout of the call type in the mapping table to the recorded data; and populating the arguments to the call with the matched data.

17. The computer system of claim 14, wherein a replayer has read-write access to the system memory where the application load modules and the callback modules are loaded; the execution of the replayer is self-contained; and the replayer executes the replaying without modifying or relinking the plurality of target modules, and without debugging or tracing tools.

\* \* \* \* \*